(12) United States Patent
Aquilano et al.

(10) Patent No.: US 11,190,311 B2
(45) Date of Patent: Nov. 30, 2021

(54) MULTI-CHANNEL COMMUNICATION USING TIMESLOTS

(71) Applicant: Analog Devices International Unlimited Company, Limerick (IE)

(72) Inventors: Gina Aquilano, Somerville, MA (US); Cornelius O'Mahony, Limerick (IE); Lance Doherty, Boston, MA (US); Michael Obrien, Cork (IE); Andre Wolokita, Melbourne (AU); Sean Williams, Melbourne (AU)

(73) Assignee: Analog Devices International Unlimited Company, Limerick (IE)

( * ) Notice: Subject to any disclaimer, the term of this patent is extended or adjusted under 35 U.S.C. 154(b) by 190 days.

(21) Appl. No.: 16/431,447

(22) Filed: Jun. 4, 2019

(65) Prior Publication Data

US 2019/0379497 A1    Dec. 12, 2019

Related U.S. Application Data

(60) Provisional application No. 62/682,802, filed on Jun. 8, 2018.

(51) Int. Cl.
| | |
|---|---|
| *H04L 5/00* | (2006.01) |
| *H04W 76/15* | (2018.01) |
| *H04L 1/16* | (2006.01) |
| *H04W 72/04* | (2009.01) |
| *H04W 56/00* | (2009.01) |
| *H04W 4/40* | (2018.01) |
| *H04W 52/02* | (2009.01) |

(Continued)

(52) U.S. Cl.
CPC .......... *H04L 5/0035* (2013.01); *H04L 1/1621* (2013.01); *H04L 5/0042* (2013.01);
(Continued)

(58) Field of Classification Search
CPC ................ H04L 5/0035; H04L 1/1621; H04L 5/0042; H04W 76/15; H04W 72/0446;
(Continued)

(56) References Cited

U.S. PATENT DOCUMENTS 10,034,227 B1 *   7/2018   Jiang .................... H04L 5/0055
2009/0245286 A1  10/2009   Kore et al.
(Continued)

FOREIGN PATENT DOCUMENTS

EP         1213844 A1 *   6/2002   ........... H04B 1/7115

OTHER PUBLICATIONS

"European Application Serial No. 19178589.8, Extended European Search Report dated Oct. 25, 2019", 9 pgs.

(Continued)

*Primary Examiner* — Omar J Ghowrwal
(74) *Attorney, Agent, or Firm* — Schwegman Lundberg & Woessner, P.A.

(57) ABSTRACT

A system and method for increasing capacity and throughput in a wireless network includes a plurality of wireless nodes configured to communicate wirelessly with one another on respective frequency channels according to a schedule. The schedule includes timeslots. For respective timeslots, first and second transmitting wireless nodes generate transmissions for a receiving wireless node. The receiving wireless node includes a receiver circuit configured to receive the transmissions from the first and the second transmitting wireless nodes simultaneously and on separate frequency channels, and a transmitter circuit configured to generate acknowledgment packets for the first and the second transmitting wireless nodes upon receipt of the transmissions by the receiving wireless node.

20 Claims, 9 Drawing Sheets

(52) U.S. Cl.
CPC ......... *H04W 4/40* (2018.02); *H04W 52/0212* (2013.01); *H04W 56/002* (2013.01); *H04W 56/0025* (2013.01); *H04W 72/0446* (2013.01); *H04W 76/15* (2018.02); *Y02D 30/70* (2020.08)

(58) Field of Classification Search
CPC ........... H04W 56/0025; H04W 56/002; H04W 4/40; H04W 52/0212; Y02D 30/70
See application file for complete search history.

(56) References Cited

U.S. PATENT DOCUMENTS

| | | |
|---|---|---|
| 2012/0013509 A1 | 1/2012 | Wisherd et al. |
| 2013/0229996 A1 | 9/2013 | Wang et al. |
| 2015/0119021 A1* | 4/2015 | Song ................. H04W 52/0229 455/426.1 |
| 2016/0330714 A1* | 11/2016 | Hedayat ............ H04W 72/1289 |
| 2016/0345347 A1* | 11/2016 | Cheng ..................... H04L 25/00 |
| 2017/0013559 A1* | 1/2017 | Sumitomo ........ H04W 52/0254 |
| 2019/0191463 A1* | 6/2019 | Namba ............. H04W 74/0816 |

OTHER PUBLICATIONS

"European Application Serial No. 19178589.8, Communication Pursuant to Article 94(3) EPC dated Dec. 11, 2020", 6 pgs.
"European Application Serial No. 19178589.8, Response filed Apr. 7, 2021 to Communication Pursuant to Article 94(3) EPC dated Dec. 11, 2020", 25 pgs.

* cited by examiner

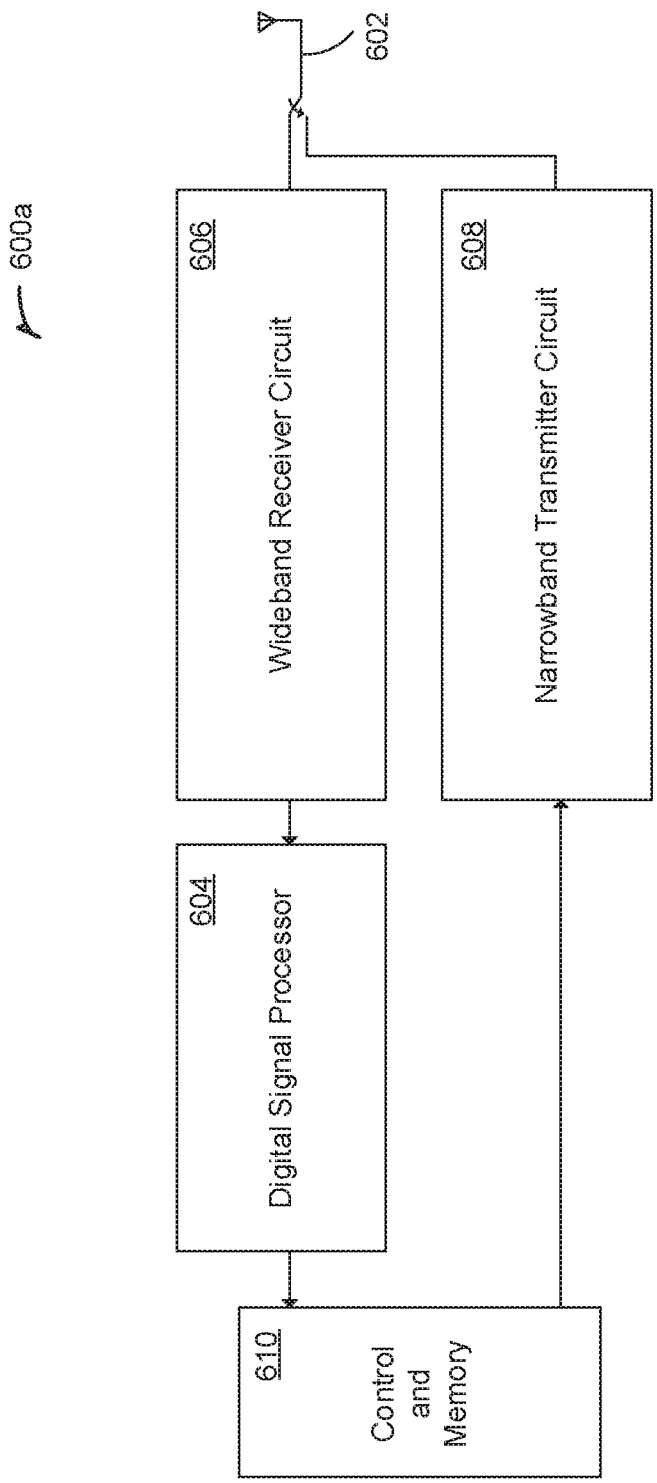

MULTI-CHANNEL COMMUNICATION USING TIMESLOTS

CLAIM OF PRIORITY

This application claims priority to U.S. Provisional Application No. 62/682,802, filed Jun. 8, 2018, which is hereby incorporated by reference in its entirety.

TECHNICAL FIELD

This document pertains generally, but not by way of limitation, to multi-channel communication, and particularly but not by way of limitation to wireless multi-channel communication in low power systems.

BACKGROUND

Wireless networks provide communication between nodes without the cost and complexity of routing cables. Wireless nodes can be distributed in remote or otherwise hard-to-reach locations. These nodes can include one more local power sources configured to provide power for the node, for example. To conserve power, low power communication schemes have been developed to limit power consumption due to data communication.

SUMMARY

It is desirable to increase throughput and capacity in low power wireless networks. For example, in conventional time synchronized channel hopping (TSCH) implemented networks, only one frequency channel is used to transmit data during each timeslot. Therefore, throughput is limited by only allowing one node to wirelessly transmit at a time. The present inventors have realized, among other things, that scheduling multiple wireless nodes to communicate during a single timeslot can increase throughput and capacity while still providing a low power communication scheme.

In one example, a system for increasing capacity and throughput in a wireless network includes a plurality of wireless nodes configured to communicate wirelessly with one another on respective frequency channels according to a schedule. The schedule includes timeslots. For respective timeslots, first and second transmitting wireless nodes generate transmissions for a receiving wireless node. The receiving wireless node includes a receiver circuit configured to receive the transmissions from the first and the second transmitting wireless nodes simultaneously and on separate frequency channels, and a transmitter circuit configured to generate acknowledgment packets for the first and the second transmitting wireless nodes upon receipt of the transmissions by the receiving wireless node.

In another example, a method for increasing capacity and throughput in a wireless network in which a plurality of wireless nodes are configured to communicate wirelessly with one another on respective frequency channels according to a schedule, includes receiving, by a receiver circuit of a receiving wireless node during a respective timeslot, transmissions from first and second transmitting wireless nodes simultaneously and on separate frequency channels; and generating, by a transmitter circuit of the receiving wireless node, acknowledgment packets for the first and the second transmitting wireless nodes upon receipt of the transmission by the receiving wireless node.

In another example, a system for monitoring one or more parameters of a vehicle component includes a plurality of wireless nodes configured to communicate wirelessly with a network manager on frequency channels according to a schedule. The schedule includes timeslots. For respective timeslots, first and second transmitting wireless nodes generate transmissions for the network manager. The network manager includes a receiver circuit configured to receive the transmissions from the first and the second transmitting wireless nodes simultaneously and on separate frequency channels, and a transmitter circuit configured to generate acknowledgment packets for the first and the second transmitting wireless nodes upon receipt of the transmissions by the network manager.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6A is a block diagram illustrating an example transceiver circuit for a wireless node capable of single-channel transmission and multi-channel reception using a single antenna.

DETAILED DESCRIPTION

A low power wireless system is disclosed herein that employs wireless communication on multiple channels simultaneously. For example, the system may employ time synchronized channel hopping (TSCH) with multiple scheduled communications per timeslot. In an example, the wireless system is a wireless battery monitoring system for a vehicle. Each wireless node can be positioned to sense a characteristic of one or more battery cells, such as a current through the cells or a voltage across the cells, for example. A wireless node, such as a network manager, for example, can employ one or more wideband radios, multiple narrowband radios, or a combination thereof to receive communication on multiple channels simultaneously. The wireless node can transmit acknowledgement packets (ACKs) to each node that provided the simultaneous communication. The ACKs can be simultaneous using a wideband radio or multiple narrowband radios, or can be staggered using a single narrowband radio, for example.

Figure 1:
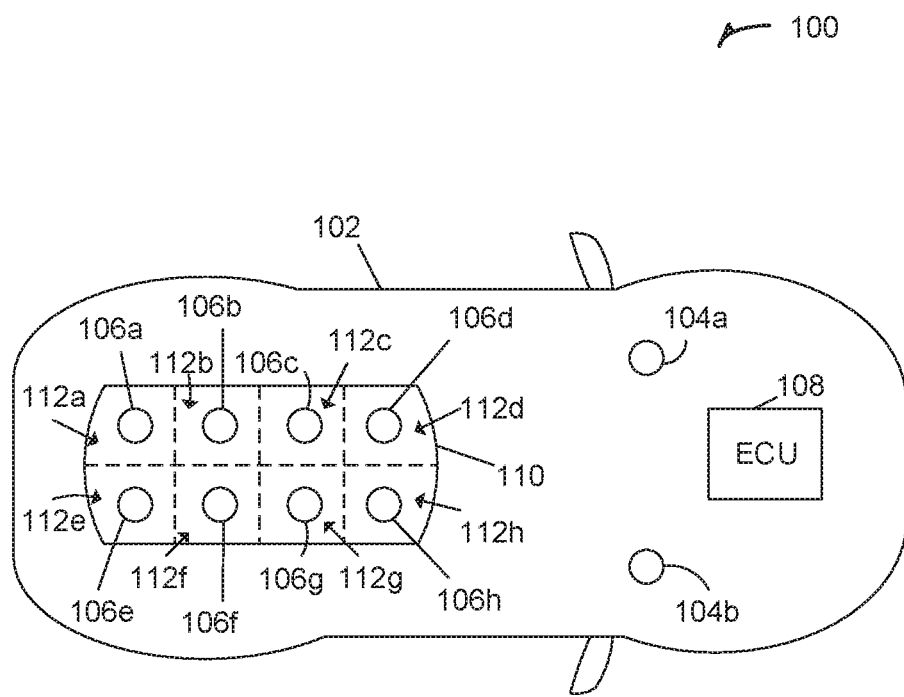
FIG. 1 is a diagram illustrating a wireless battery monitoring system for a vehicle.

FIG. 1 is a diagram illustrating a system 100 for a vehicle 102 that employs simultaneous multi-channel communication between wireless nodes. The vehicle 102 may include network managers 104a and 104b, wireless nodes 106a-106h, an electronic control unit (ECU) 108, and a battery pack 110 that includes battery modules 112a-112h. Each battery module 112a-112h can include several battery cells. In one example, each module 112a-112h includes 12 battery cells. In other embodiments, each module 112a-112h can include any number of battery cells. While illustrated as a wireless battery monitoring system, the system 100 can be used for monitoring any component of a vehicle or other apparatus within which a low-power wireless system is desired.

The wireless nodes 106a-106h can be wireless sensors, for example, configured to sense operational characteristics of the battery cells of each of the battery modules 112a-112h, including, but not limited to, a voltage across or current through a respective battery module 112a-112h. The network managers 104a and 104b can collect the sensed data from the wireless nodes 106a-106h, for example, and provide the data to a host application running on the ECU 108 or other system through a wired or wireless connection. The host application can use the data to monitor the health of, and provide control for, the battery pack 110. The wireless nodes 106a-106h and network managers 104a and 104b can be configured using a mesh network topology, a star topology, a multi-hop topology, or any other wireless network configuration.

In an example, the ECU 108 is configured to execute a host application for the battery monitoring system. While described in this example as hosted by the ECU 108, the host application can be executed by any other computing system. For example, the host application can be executed by one of the managers 104a and/or 104b. The ECU 108 can include, for example, software, hardware, and combinations of hardware and software configured to execute several functions related to control of the battery monitoring system. The ECU 108 can include controllers or processors such as any one or more of a microprocessor, a controller, a digital signal processor (DSP), an application specific integrated circuit (ASIC), a field-programmable gate array (FPGA), or equivalent discrete or integrated logic circuitry. The ECU 108 can also include storage devices, including short-term and/or long-term memory that can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

Figure 2A:
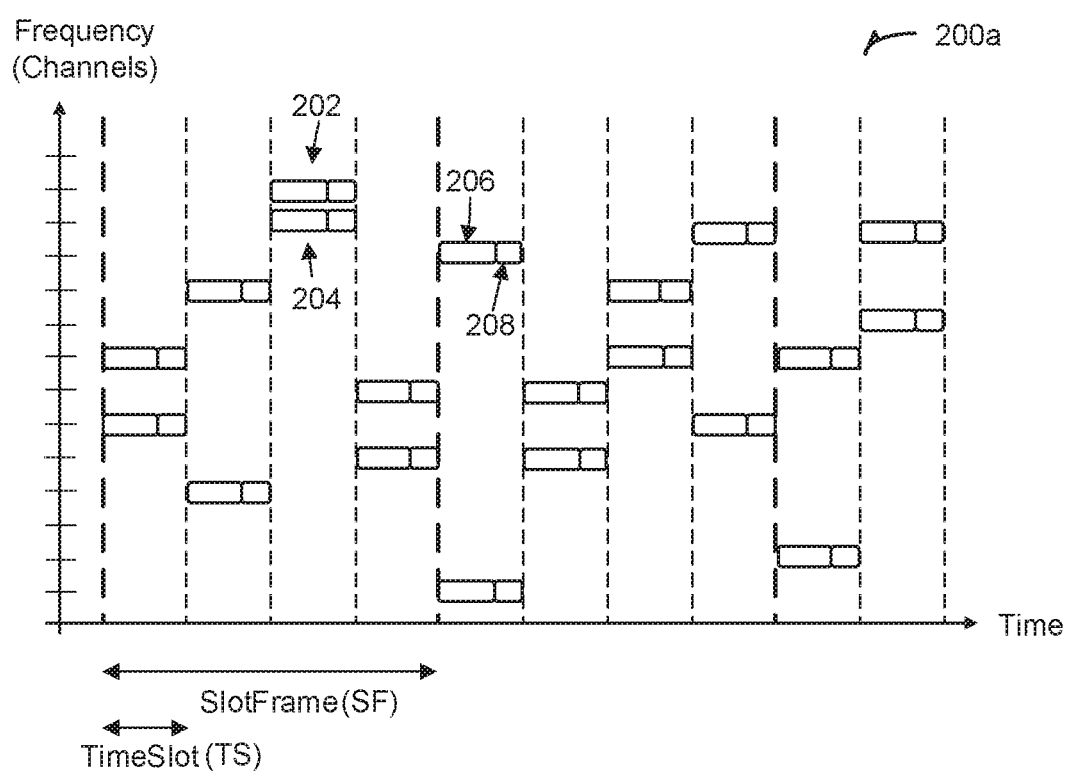
FIG. 2A is a chart illustrating an example time synchronized channel hopping (TSCH) schedule for a wireless network.

In one example, the network managers 104a and 104b may be configured to communicate with the wireless nodes 106a-106h using time synchronized channel hopping (TSCH). FIG. 2A is a chart illustrating an example TSCH schedule 200a for a wireless network that includes multi-channel communication for each timeslot. A gateway, network manager, or other wireless node can include a wideband radio, multiple narrowband radios, or a combination thereof, for example, to permit simultaneous communication with two or more other nodes on two or more respective channels. The network can schedule communication between the nodes so that each node knows when, and at what frequency, to transmit. While illustrated in FIG. 2A as permitting two wireless nodes to communicate with another wireless node simultaneously, other examples can allow any number (N) of wireless nodes to communicate simultaneously with another wireless node device. While discussed as implemented using a TSCH scheme, the network can be implemented using any other low power wireless communication scheme in which nodes are scheduled to communicate during a respective timeslot.

For the TSCH schedule 200, a timeslot (IS) is defined. This can be any amount of time, such as 10 ms, to allow for a wireless node (nodes 106a-106h, for example) to transmit a communication to another node (nodes 104a and 104b, for example) and receive an acknowledgement (ACK) from the node. Each network node is allocated one or more predefined timeslots within a defined slot frame (SF). Thus, as seen in FIG. 2, eight transmissions occur during the first SF, allowing each of the eight nodes 106a-106h of FIG. 1, for example, to communicate with the managers 104a and/or 104b. Each IS can be static or dynamic, for example, to accommodate systems that may communicate at multiple data rates. In the example illustrated in FIG. 2A, each IS includes a data communication 202 from a first node and a simultaneous data communication 204 from a second node.

Each communication 202 and 204 includes a data transmission 206 and an ACK 208. In the example illustrated in FIG. 2A, the ACKs 208 are communicated simultaneously for each TS. Thus, the ACK 208 for the communication 202 is sent at the same time as the ACK 208 for communication 204. This can be accomplished by the network manager 104a or 104b, for example, using a wideband radio transmitter or multiple narrowband radio transmitters, for example. By transmitting the ACKs 208 simultaneously, each IS can be as short as a single data transmission and ACK. While illustrated in FIG. 2A as being sent on the same channel as the respective data transmission 206, in other examples, the respective ACK 208 can be transmitted on a different channel than the data transmission 206.

Figure 2B:
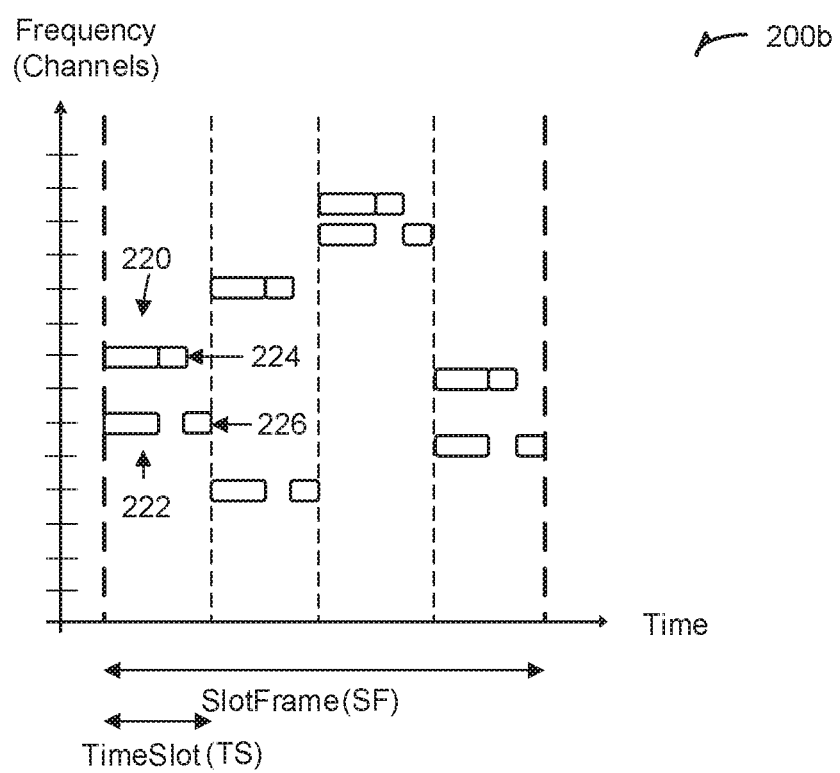
FIG. 2B is a chart illustrating another example TSCH schedule that includes staggered acknowledgements for each timeslot.

FIG. 2B is a chart illustrating another example TSCH schedule 200b that includes staggered acknowledgements for each TS. For each TS, a wireless node, such as a network manager 104a and/or 104b, for example, can be configured to receive data transmissions 220 and 222 simultaneously. The wireless node can then provide staggered ACKs, transmitted during subsequent time periods for the respective TS. For example, the wireless node can provide an ACK 224 for the data transmission 220, followed by an ACK 226 for the data transmission 222. The length of each TS can be set accordingly to allow for the staggered ACKs 224 and 226. While illustrated as two simultaneous transmission and two respective ACKs, any number of simultaneous transmissions and respective ACKs can be scheduled providing the TS is sized appropriately. While illustrated in FIG. 2B as transmitted on separate channels, in other examples, the ACKs 224 and 226 can be transmitted on the same channel, which may be the same channel as the data transmission 220, the data transmission 222, or a different channel.

The schedule 200b can be used by networks in which it may be desirable to have wireless nodes capable of receiving multiple transmissions simultaneously, but only capable of transmitting on a single channel at a time. This can increase capacity while minimizing power consumption for the wireless nodes that have to transmit the ACKs in that the wireless nodes can include a single, low power narrowband radio transmitter.

Figure 3:
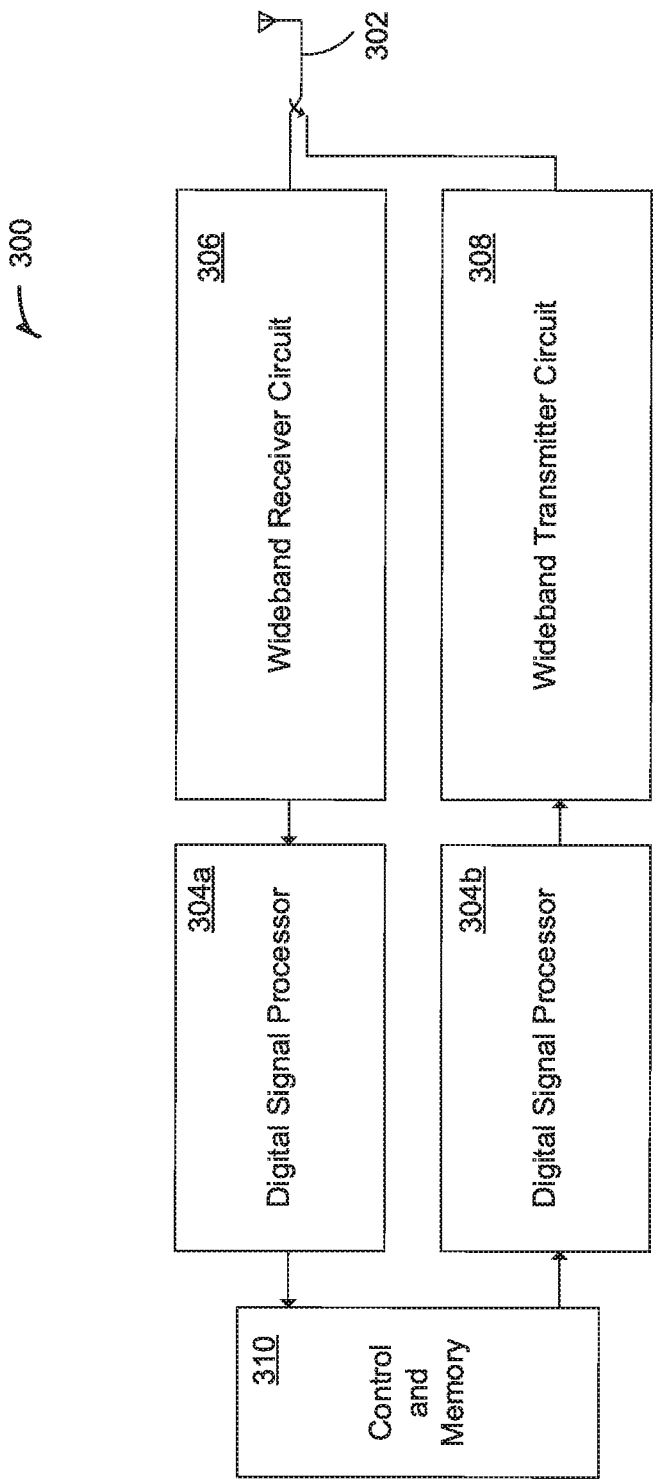
FIG. 3 is a block diagram illustrating an example transceiver circuit for a wireless node capable of multi-channel transmission and reception using a single antenna.

FIG. 3 is a block diagram illustrating an example transceiver circuit 300 for a wireless node capable of multi-channel transmission and reception using a single antenna 302. The transceiver circuit 300 includes digital signal processing circuits 304a and 304b, a wideband radio receiver circuit 306, and a wideband radio transmitter circuit 308. A control and memory circuit 310 can be connected to provide data to the digital signal processor 304b and receive data from the digital signal processor 304a, The data can be provided and received as a baseband signal, such as through a stream of data bits.

The wideband radio receiver circuit 306 is configured to receive transmissions through the antenna 302. These transmissions can include data from multiple wireless nodes simultaneously on separate channel frequencies. The wideband radio receiver circuit 306 may be configured to receive a wideband signal through the antenna 302 and convert the signal into a digital signal for the digital signal processor 304a. In an example, the wideband receiver circuit 306 can be configured to convert the received signal into wideband digital in-phase and quadrature (IQ) signals.

The digital signal processor 304a may be configured to generate baseband signals from the received wideband digital signals. For example, the digital signal processor 304a can receive wideband IQ signals, and convert the wideband IQ signals into separate baseband signals for each transmission received. In an example, the control and memory circuit 310 may provide control to the digital signal processor 304a indicating which frequency channels are used for a current timeslot. The digital signal processor 304a may use the channel information to extract the baseband signals from the wideband digital signals. The baseband signals can then be provided to the control and memory circuit 310.

In the example illustrated in FIG. 3, the transceiver circuit 300 can transmit ACKs simultaneously for the received data transmissions. The control and memory circuit 310 can provide the acknowledgement baseband signals along with transmission channel information, for example, to the digital signal processor 304b. The digital signal processor 304b can modulate the digital ACK data on multiple carriers for respective transmission frequency channels and combine the multiple carriers into a digital wideband signal, for example. In an example, the digital wideband signal can be a digital IQ signal.

The wideband radio transmitter circuit 308 may convert the digital wideband signal into an analog wideband signal. In an example, the wideband transmitter circuit 308 can then shift and combine the wideband analog IQ signals to generate an output signal that includes the data for multiple ACKs. The output signal can then be transmitted through the antenna 302. This way, a wireless node that includes the transceiver circuit 300 can receive multiple data transmissions simultaneously and provide multiple ACKs simultaneously and can therefore implement a transmission schedule such as that illustrated in FIG. 2A, for example.

Figure 4A:
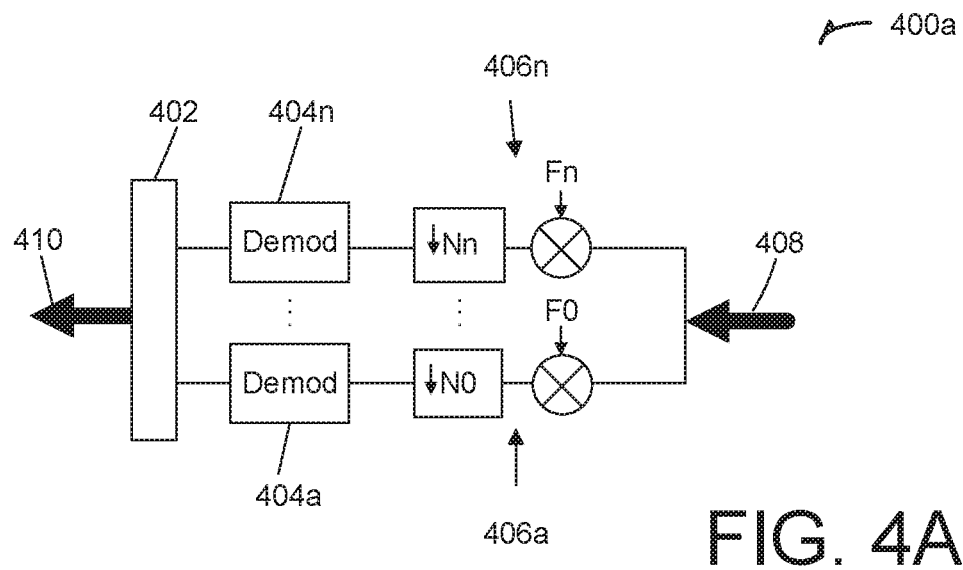
FIGS. 4A and 4B are diagrams illustrating example digital signal processor receiver and transmitter circuits, respectively.

The control and memory circuit 310 can include one or more application-specific or general-purpose processor circuits. Such circuits can include system-on-chip (SoC) realization or such circuits can be field-programmable. The control and memory circuit 310 can also include one or more volatile or non-volatile memories. For example, the control and memory circuit 310 can include one or more non-volatile memories including read-only memories (ROMs), flash memories, solid state drives, or any other non-volatile memory, and one or more volatile memories including, for example, static or dynamic random-access memories (RAM). The control and memory circuit 310 can implement network management and a protocol stack, for example, for a network within which a respective wireless node belongs, FIG. 4A is a diagram illustrating an example digital signal processor 400a for a receiver circuit of a wireless node, such as the digital signal processor 304a illustrated in FIG. 3. The digital signal processor 400a includes interface 402, demodulation circuits 404a-404n, and digital downconverter circuits 406a-406n. The digital signal processor 400a receives a digital signal 408, for example, from a radio receiver circuit. The digital signal 408 may be a wideband digital signal, such as a wideband signal, for example. The digital signal processor 400a outputs a signal 410 that can include, for example, digital baseband information. The digital signal processor 400a can include additional or alternative components to achieve any additional or alternative desirable behavior.

The digital signal 408 can be received by respective digital downconverter circuits 406a-406n. The number of digital downconverters 406a-406n can be selected based on how many channels a respective wireless node may desire to receive simultaneous communication. In another example, the digital signal processor circuit 400a can include as many digital downconverters 406a-406n as there are communication channels for the network such that the digital signal processor circuit 400a does not need to know which channels are currently being used.

Each digital downconverter circuit 406a-406n can include respective mixers and respective oscillators. The oscillators can be digital local oscillators (DLO) or numerically controlled oscillators (NCO), for example, tuned to a frequency indicative of, or otherwise corresponding to, a respective channel. The frequency/channel can be programmable, for example, by a respective control circuit of the respective wireless node, such that the digital signal processor 400a can handle communication on different channels for each timeslot of a TSCH schedule, for example. The demodulation circuits 404a-404n can then be used to demodulate the signals to recover the original data of the data transmissions, which can be provided to the control and memory circuit through the interface 402.

Figure 4B:
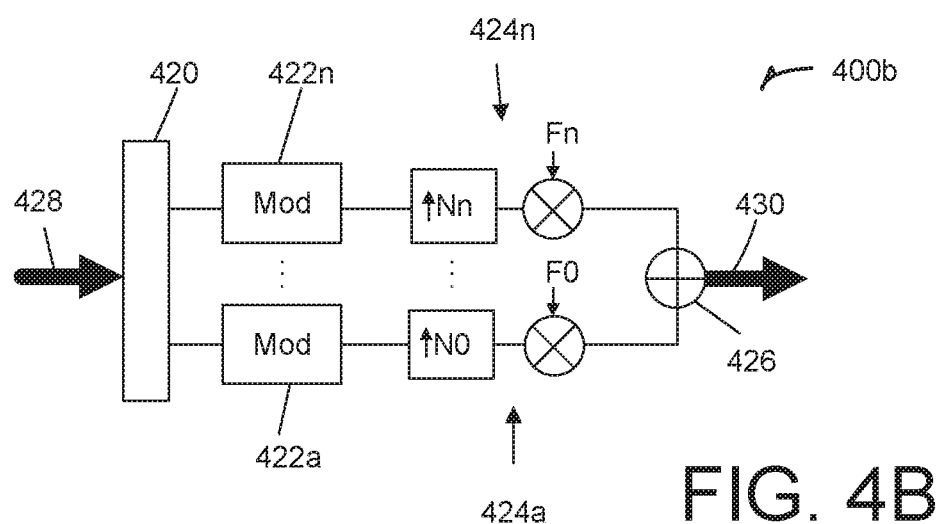

FIG. 4B is a diagram illustrating an example digital signal processor 400b for a transmitter circuit of a wireless node, such as the digital signal processor 304b illustrated in FIG. 3. The digital signal processor 400b includes interface 420, modulation circuits 422a-422n, digital upconverter circuits 424a-424n, and adder 426. The digital signal processor 400b receives baseband information 428 from a control circuit, for example, for transmission. The digital signal processor 400b outputs a digital signal 430 to a radio transmitter circuit, for example. The digital signal 430 may be a wideband digital signal, such as a wideband digital IQ signal, for example. The digital signal processor 400b can include additional or alternative components to achieve any additional or alternative desirable behavior.

The digital data 428 from the control circuit can be modulated by respective modulation circuits 422a-422n. The modulation circuits 422a-422n can be configured to modulate the digital data 428 using any desirable modulation scheme. In an example, the modulation circuits 422a-422n are configured to modulate respective data onto respective carriers for simultaneous transmission. The modulated data may be provided to a respective digital upconverter circuit 424a-424n. The number of digital upconverters 424a-424n can be selected based on how many channels a respective wireless node may desire to transmit simultaneous communication. The digital upconverters 424a-424n may receive control signals from a control and memory circuit, for example, indicative of respective frequency channels for the data communications.

Each digital upconverter circuit 424a-424n can include respective mixers and respective oscillators. The oscillators can be digital local oscillators (DLO) or numerically controlled oscillators (NCO), for example, tuned to a frequency indicative of, or otherwise corresponding to, a respective channel. The frequency/channel can be programmable, for example, by a respective control circuit of the respective wireless node, such that the digital signal processor 400a can handle communication on different channels for each timeslot of a TSCA schedule, for example. The adder 426 can then be used to sum the signals from each digital upconverter circuit 424a-424n to provide a digital wideband IQ signal 430 as output, for example, to a respective wideband radio transmitter circuit.

Figure 5A:
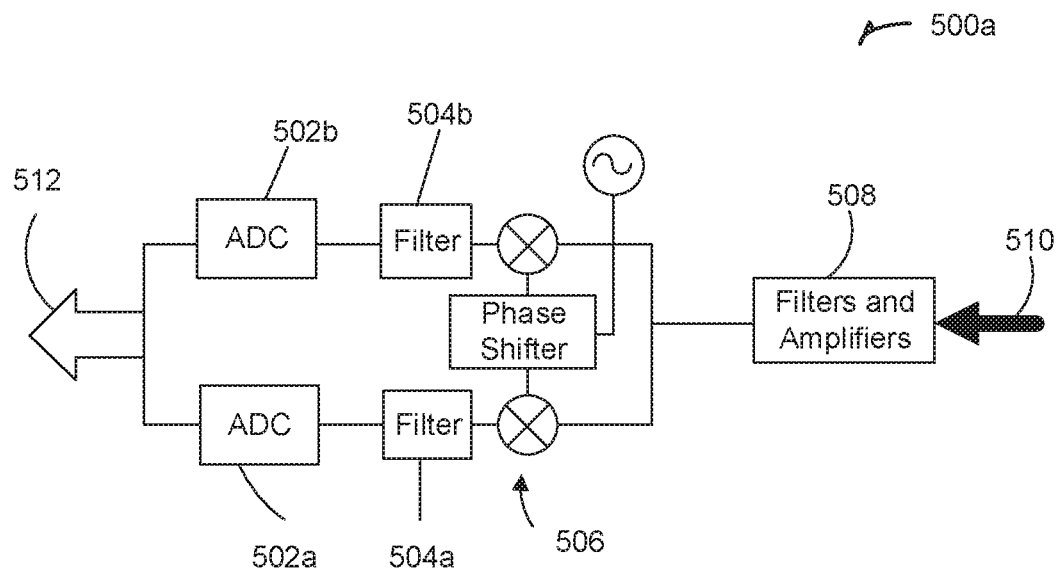
FIGS. 5A and 5B are diagrams illustrating example radio receiver and transmitter circuits, respectively.
Figure 5B:
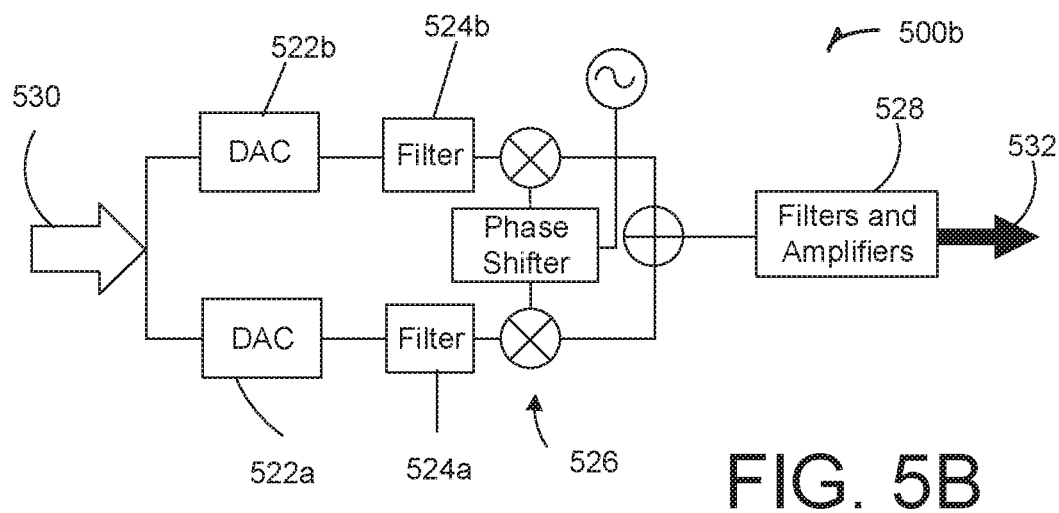

FIGS. 5A and 5B are diagrams illustrating example radio receiver and transmitter circuits, respectively. FIG. 5A is a diagram illustrating an example radio receiver circuit 500a, such as the radio receiver circuit 306 of FIG. 3. The radio receiver circuit 500a includes analog-to-digital converters (ADCs) 502a and 502b, filters 504a and 504b, phase shift circuit 506, and filter and amplifier circuit 508. The radio receiver circuit 500a receives a signal 510 through an antenna. The signal 510 may be a wideband signal, for example. The filter and amplifier circuit 508 can include a low noise amplifier (LNA), for example and one or more filters to condition the received signal 510.

The phase shift circuit 506 may be configured to shift the received signal 510 into analog quadrature and in-phase (IQ) signals. The ADCs 502a and 502b are configured to convert the analog IQ signals into digital IQ data for a respective digital signal processing circuit, such as the digital signal processing circuit 400a illustrating in FIG. 4A. The radio receiver circuit 500a can include additional or alternative components to achieve any additional or alternative desirable behavior.

FIG. 5B is a diagram illustrating an example radio transmitter circuit 500b, such as the radio transmitter circuit 308 of FIG. 3. The radio transmitter circuit 500b includes digital-to-analog converters (DACs) 522a and 522b, filters 524a and 524b, phase shift circuit 526, and filter and amplifier circuit 528. The radio transmitter circuit 500a may receive a signal 530 from a digital signal processing circuit, for example, such as the digital signal processor 400b illustrated in FIG. 4B. The signal 530 may be a digital wideband signal, for example, such as digital wideband IQ signals. The filter and amplifier circuit 528 can include a power amplifier (PA), for example, and various filters to condition the signal 532 for transmission through an antenna.

The DACs may be configured to convert the digital signal 532 into an analog signal, such as a wideband analog IQ signal. The phase shift circuit 526 may be configured to shift the analog IQ signals into phase and sum the in-phase signals to generate the output signal 532. The output signal 532 is amplified and conditioned by the filter and amplifier circuit 528 for transmission through an antenna, for example. The radio transmitter circuit 500b can include additional or alternative components to achieve any additional or alternative desirable behavior.

Figure 6B:
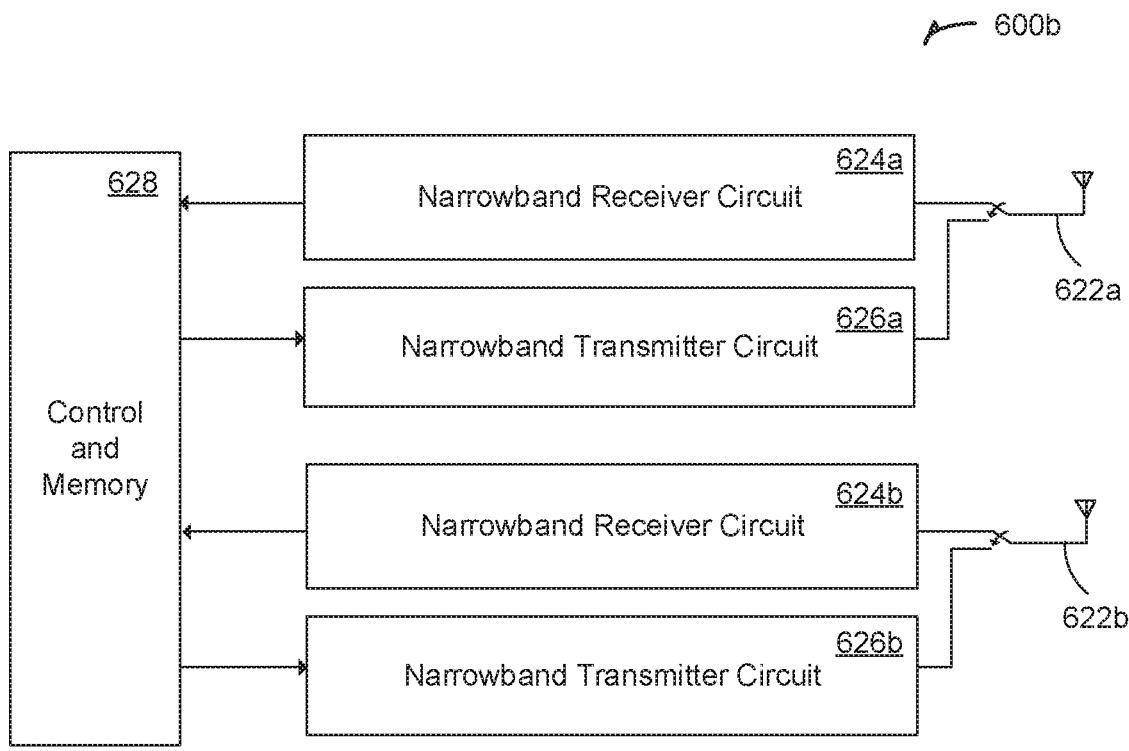
FIG. 6B is a block diagram illustrating an example transceiver circuit for a wireless node capable of multi-channel transmission and reception using multiple antennas.
Figure 6C:
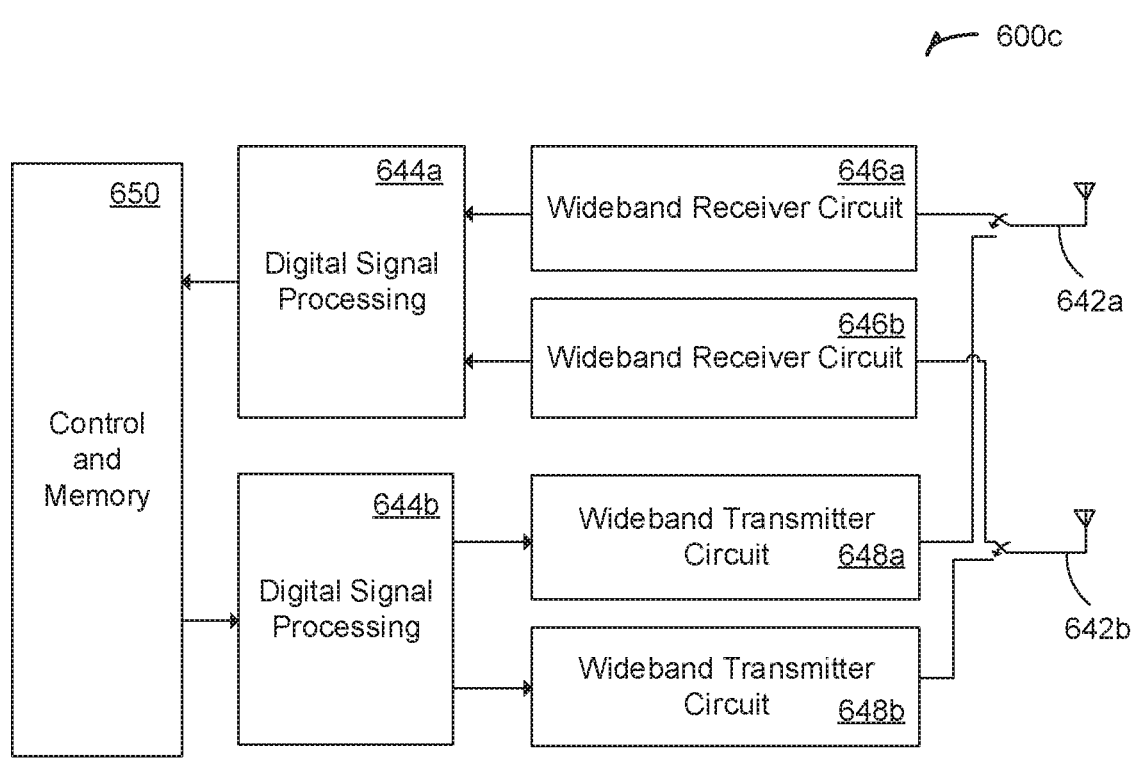
FIG. 6C is a block diagram illustrating an example transceiver circuit for a wireless node capable of multi-channel transmission and reception using multiple antennas.

FIGS. 6A-6C are block diagrams illustrating example transceiver circuits for use by wireless nodes implementing the transmission schedules of FIGS. 2A and 2B. FIG. 6A is a block diagram illustrating an example transceiver circuit 600a for a wireless node capable of single-channel transmission and multi-channel reception using a single antenna 602. The transceiver circuit 600a includes a digital signal processing circuit 604, a wideband radio receiver circuit 606, and a narrowband radio transmitter circuit 608. A control and memory circuit 610 can be connected to provide data to the narrowband radio transmitter circuit 608 and receive data from the digital signal processor 604. The data can be provided and received as a baseband signal, such as through a stream of data bits. The control and memory circuit 610 may be similar to the control and memory circuit 310 illustrated in FIG. 3.

The wideband radio receiver circuit 606 is configured to receive transmissions through the antenna 602. These transmissions can include data from multiple wireless nodes simultaneously on separate channel frequencies. The wideband radio receiver circuit 606 may be configured similar to the radio receiver circuit 500a to receive a wideband signal through the antenna 602 and convert the signal into a digital signal for the digital signal processor 604. In an example, the wideband receiver circuit 606 can be configured to convert the received signal into wideband digital in-phase and quadrature (IQ) signals.

The digital signal processor 604 may be configured similar to the digital signal processor 400a to generate baseband signals from the received wideband digital signals. For example, the digital signal processor 604 can receive wideband IQ signals, and convert the wideband IQ signals into separate baseband signals for each transmission received. In an example, the control and memory circuit 610 may provide control to the digital signal processor 604 indicating which frequency channels are used for a current timeslot. The digital signal processor 604 may use the channel information to extract the baseband signals from the wideband digital signals. The baseband signals can then be provided to the control and memory circuit 610.

In the example illustrated in FIG. 6A, the transceiver circuit 600a can transmit ACKs one at a time for the received data transmissions, such as is illustrated in FIG. 2B. The control and memory circuit 610 can provide the acknowledgement data bit stream to the narrowband radio transmitter circuit 608. The narrowband radio transmitter circuit 608 can be implemented similarly to the radio transmitter circuit 500b, but may include a modulation circuit. The narrowband radio transmitter circuit 608 may modulate the data bit stream to generate a narrowband IQ signal, for example, which can be conditioned and transmitted through the common antenna 602. This way, a wireless node that includes the transceiver circuit 600a can receive multiple data transmissions simultaneously and provide staggered ACKs and can therefore implement a transmission schedule such as that illustrated in FIG. 2B, for example.

FIG. 6B is a block diagram illustrating an example transceiver circuit 600b for a wireless node capable of multi-channel transmission and reception using multiple antennas 622a and 622b. The transceiver circuit 600b includes narrowband radio receiver circuits 624a and 624b, and narrowband radio transmitter circuits 626a and 626b. A control and memory circuit 628 can be connected to provide data to the narrowband radio transmitter circuits 626a and 626b, and receive data from the narrowband radio receiver circuits 624a and 624b. The data can be provided and received as a baseband signal, such as through a stream of data bits. The control and memory circuit 628 may be similar to the control and memory circuit 310 illustrated in FIG. 3.

The narrowband radio receiver circuits 624a and 624b are configured to receive transmissions through the respective antennas 622a and 622b. These transmissions can include data from separate nodes simultaneously on separate channel frequencies. For example, the narrowband radio receiver circuit 624a may be configured to receive data communication through the antenna 622a on a first channel frequency and the narrowband radio receiver circuit 624b may be configured to receive data communication through the antenna 622b on a second channel frequency to allow simultaneous data reception.

In the example illustrated in FIG. 6B, the transceiver circuit 600b can transmit ACKs simultaneously, such as is illustrated in FIG. 2A. The control and memory circuit 628 can provide the acknowledgement data bit streams to the respective narrowband radio transmitter circuits 626a and 626b. The narrowband radio transmitter circuit 626a can modulate the data bit stream for the first ACK to generate a narrowband IQ signal, for example, which can be conditioned and transmitted through the common antenna 622a, and the narrowband radio transmitter circuit 626b can modulate the data bit stream for the second ACK to generate a narrowband IQ signal, for example, which can be conditioned and transmitted through the common antenna 622b. This way, a wireless node that includes the transceiver circuit 600b can receive multiple data transmissions simultaneously and provide multiple ACKs simultaneously and can therefore implement a transmission schedule such as that illustrated in FIG. 2A, for example.

FIG. 6C is a block diagram illustrating an example transceiver circuit 600c for a wireless node capable of multi-channel transmission and reception using multiple antennas 642a and 642b. The transceiver circuit 600c includes digital signal processing circuits 644a and 644b, wideband radio receiver circuits 646a and 646b, and wideband radio transmitter circuits 648a and 648b. A control and memory circuit 650 can be connected to provide data to the digital signal processing circuit 644b, and receive data from the digital signal processing circuit 644b. The data can be provided and received as a baseband signal, such as through a stream of data bits. The control and memory circuit 650 may be similar to the control and memory circuit 310 illustrated in FIG. 3.

The wideband data reception and transmission can be similar to that illustrated and described for FIG. 3. In the example illustrated in FIG. 6C, the control and memory circuit 650 can employ antenna diversity to redundantly receive the same data and select the best signal for a respective frequency channel. Thus, a wireless node employing the transceiver circuit 600c can employ a schedule such as the schedule 200a illustrated in FIG. 2A, and can increase the reliability of the system by employing antenna diversity.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system for increasing capacity and throughput in a wireless network, the system comprising:
    a plurality of wireless nodes configured to communicate wirelessly on respective frequency channels according to a schedule, wherein the schedule comprises timeslots, and wherein for respective timeslots, first and second transmitting wireless nodes generate transmissions for a receiving wireless node, the receiving wireless node comprising:
    a receiver circuit configured to receive the transmissions from the first and the second transmitting wireless nodes simultaneously and on separate frequency channels, the receiver circuit comprising:
        a wideband radio circuit configured to receive the transmissions through an antenna and generate a wideband signal,
        a digital signal processing circuit configured to receive the wideband signal and generate first and second baseband signals from the wideband signal,
        wherein the first and second baseband signals correspond to the respective transmissions from the first and the second transmitting wireless nodes.

2. The system of claim 1, wherein the receiving wireless node comprises:
a transmitter circuit configured to generate acknowledgment packets for the first and the second transmitting wireless nodes upon receipt of the transmissions by the receiving wireless node.

3. The system of claim 2, wherein the transmitter circuit of the receiving wireless node is configured to transmit on a single channel at a time, and wherein the receiving wireless node is configured to transmit the acknowledgment packets to the first and the second transmitting wireless nodes in subsequent time periods of the respective timeslot.

4. The system of claim 2, wherein the transmitter circuit of the receiving wireless node is configured to transmit on multiple channels simultaneously, and wherein the receiving wireless node is configured to transmit at least a portion of first and second acknowledgment packets to the first and the second transmitting wireless nodes simultaneously.

5. The system of claim 4, wherein:
the transmitter circuit of the receiving wireless node comprises first and second narrow band radio circuits, each having a separate antenna, and
the transmitter circuit is configured to generate the first acknowledgment packet using the first narrow band radio circuit and the second acknowledgement packet using the second narrow band radio circuit.

6. The system of claim 4, wherein:
the transmitter circuit and the receiver circuit each comprise a wideband radio circuit that share a common antenna, and
the transmitter circuit is configured to generate both the first and the second acknowledgment packets using the wideband radio circuit.

7. The system of claim 1, wherein:
the plurality of wireless nodes form a battery monitoring system and are positioned to monitor at least one parameter of a vehicle battery, and
the receiving wireless node comprises a network manager of the battery monitoring system.

8. The system of claim 1, wherein the receiver circuit of the receiving wireless node comprises:
first and second antennas;
a first wideband radio circuit connected to receive the transmissions through the first antenna;
a second wideband radio circuit configured to receive the transmissions through the second antenna; and
a digital signal processing circuit configured to receive wideband signals from both the first and the second wideband radios and generate redundant first and second baseband signals from the wideband signals.

9. A method for increasing capacity and throughput in a wireless network in which a plurality of wireless nodes are configured to communicate wirelessly with one another on respective frequency channels according to a schedule, the method comprising:
receiving, by a receiver circuit of a receiving wireless node during a respective timeslot, transmissions from first and second transmitting wireless nodes simultaneously and on separate frequency channels, including:
receiving, by a wideband radio circuit, the transmissions through an antenna,
generating, by the wideband radio circuit, a wideband signal, and
generating first and second baseband signals from the wideband signal, wherein the first and second baseband signals correspond to the respective transmissions from the first and the second transmitting wireless nodes; and
generating, by a transmitter circuit of the receiving wireless node, acknowledgment packets for the first and the second transmitting wireless nodes upon receipt of the transmission by the receiving wireless node.

10. The method of claim 9, further comprising:
generating, by a transmitter circuit of the receiving wireless node, acknowledgment packets for the first and the second transmitting wireless nodes upon receipt of the transmission by the receiving wireless node.

11. The method of claim 10, wherein the receiving wireless node is configured to transmit on a single channel at a time, and wherein the method further comprises:
transmitting, by the transmitter circuit of the receiving wireless node, a first acknowledgement packet to the first transmitting wireless node; and
transmitting, by the transmitter circuit in a subsequent time period of the respective timeslot, a second acknowledgment packet to the second transmitting wireless node.

12. The method of claim 10, wherein the transmitter circuit of the receiving wireless node is configured to transmit on multiple channels simultaneously, and wherein the method further comprises:
transmitting, by the transmitter circuit of the receiving wireless node, at least a portion of first and second acknowledgment packets to the first and the second transmitting nodes simultaneously.

13. The method of claim 12, wherein the transmitter circuit of the receiving wireless node comprises first and second narrow band radio circuits, each having a separate antenna, and wherein transmitting, by the transmitter circuit of the receiving wireless node, the at least a portion of the acknowledgment packets to the first and the second transmitting nodes simultaneously comprises:
generating the first acknowledgment packet using the first narrow band radio circuit; and
generating the second acknowledgement packet using the second narrow band radio circuit.

14. The method of claim 12, wherein the transmitter circuit and the receiver circuit each comprise a wideband radio circuit that share a common antenna, and wherein the method further comprises:
generating both the first and the second acknowledgment packets using the wideband radio circuit.

15. The method of claim 9, wherein:
the plurality of wireless nodes form a battery monitoring system and are positioned to monitor at least one parameter of a vehicle battery, and
the receiving wireless node comprises a network manager of the battery monitoring system.

16. The method of claim 9, wherein the receiver circuit of the receiving wireless node comprises a first wideband radio circuit connected to receive the transmissions through a first antenna and a second wideband radio circuit configured to receive the transmissions through a second antenna, and wherein receiving, by the receiver circuit of the receiving wireless node during the respective timeslot, the transmissions comprises:
receiving wideband signals from both the first and the second wideband radios; and
generating, by a digital signal processing circuit, redundant first and second baseband signals from the wideband signals.

17. A system for monitoring one or more parameters of a vehicle component, the system comprising:
a plurality of wireless nodes configured to communicate wirelessly with a network manager on frequency channels according to a schedule, wherein the schedule comprises timeslots, and wherein for respective timeslots, first and second transmitting wireless nodes generate transmissions for the network manager, the network manager comprising:
a receiver circuit configured to receive the transmissions from the first and the second transmitting wireless nodes simultaneously and on separate frequency channels, the receiver circuit comprising:
a wideband radio circuit configured to receive the transmissions through an antenna and generate a wideband signal,
a digital signal processing circuit configured to receive the wideband signal and generate first and second baseband signals from the wideband signal,
wherein the first and second baseband signals correspond to the respective transmissions from the first and the second transmitting wireless nodes; and
a transmitter circuit configured to generate acknowledgment packets for the first and the second transmitting wireless nodes upon receipt of the transmissions by the network manager.

18. The system of claim 17, wherein the network manager comprises:
a transmitter circuit configured to generate acknowledgment packets for the first and the second transmitting wireless nodes upon receipt of the transmissions by the network manager.

19. The system of claim 18, wherein the transmitter circuit of the network manager is configured to transmit on a single channel at a time, and wherein the network manager is configured to transmit the acknowledgment packets to the first and the second transmitting wireless nodes in subsequent time periods of the respective timeslot.

20. The system of claim 18, wherein the transmitter circuit of the network manager is configured to transmit on multiple channels simultaneously, and wherein the network manager is configured to transmit at least a portion of first and second acknowledgment packets to the first and the second transmitting wireless nodes simultaneously.

* * * * *